(12) United States Patent
Silfverberg

(10) Patent No.: US 7,072,695 B2
(45) Date of Patent: Jul. 4, 2006

(54) MECHANICAL INTERACTION WITH A PHONE USING A CRADLE

(75) Inventor: Miika Silfverberg, Vantaa (FI)

(73) Assignee: Nokia Corporation, Espoo (FI)

( * ) Notice: Subject to any disclaimer, the term of this patent is extended or adjusted under 35 U.S.C. 154(b) by 171 days.

(21) Appl. No.: 10/781,044

(22) Filed: Feb. 17, 2004

(65) Prior Publication Data

US 2005/0181828 A1    Aug. 18, 2005

(51) Int. Cl.
*H04M 1/00* (2006.01)

(52) U.S. Cl. .............................. 455/569.2; 455/575.9; 455/99; 455/100

(58) Field of Classification Search ............... 455/557, 455/569.1, 575.1, 90.3, 570
See application file for complete search history.

(56) References Cited

U.S. PATENT DOCUMENTS

| 5,797,088 A * | 8/1998 | Stamegna ................... 455/345 |
| 2005/0153749 A1 * | 7/2005 | Falcon et al. ............ 455/569.1 |
| 2005/0197168 A1 * | 9/2005 | Holmes et al. ........... 455/569.1 |

* cited by examiner

*Primary Examiner*—Temica Beamer

(57) ABSTRACT

This invention describes a special cradle having mechanical switches to facilitate interactions between a communication device, such as a mobile device or a mobile phone, and a user of the devices, wherein the communication device is mounted on the cradle. When the user pushes the communication device in different directions, the device moves and tilts within the stable cradle. The movements are registered through the mechanical switches within the cradle. The states of the switches are communicated to the device (phone) through a mechanical connector or a wireless communication channel as a corresponding command, and the user interface reacts accordingly.

26 Claims, 2 Drawing Sheets

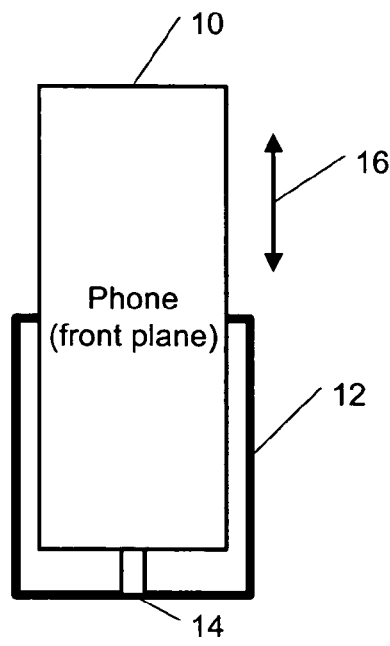
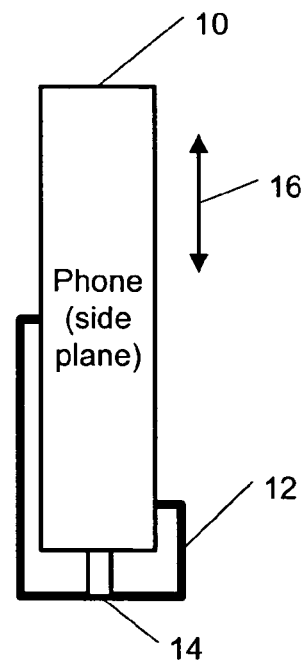
Figure 1a Figure 1b
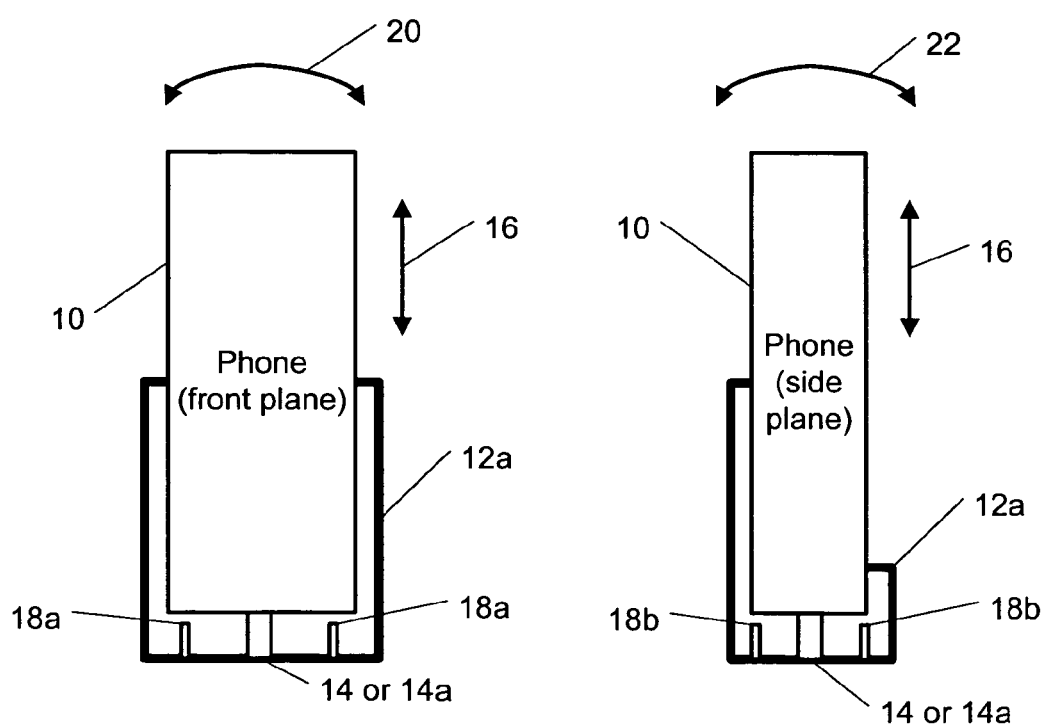
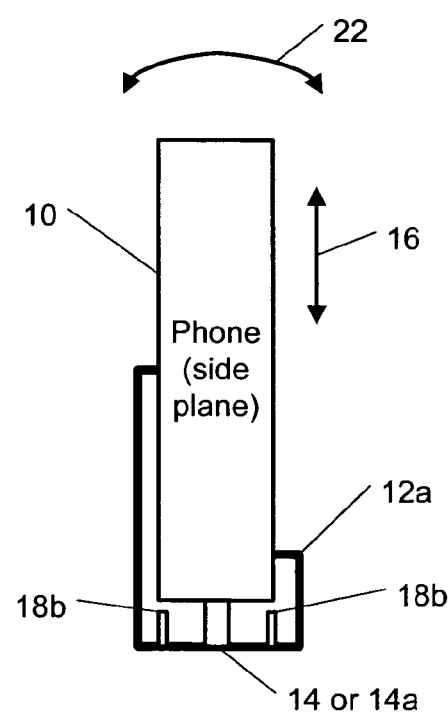
Figure 2a Figure 2b

MECHANICAL INTERACTION WITH A PHONE USING A CRADLE

FIELD OF THE INVENTION

This invention generally relates to communication devices such as mobile phones and more specifically to utilizing a specialized cradle having mechanical switches for facilitating interactions between said devices and a user of said devices.

BACKGROUND OF THE INVENTION

1. Problem Formulation

When driving a bike or a car, resources used to interact with a mobile device (phone) are limited. Operator's eyes are occupied most of the time for monitoring the traffic and hands are used for other tasks such as operating vehicle steering. However, current phone interaction is highly dependent on a visual feedback from a display, and precise motor operations. More simple and robust techniques are needed for the most important tasks, such as, e.g., incoming call handling.

2. Prior Art Solutions

Speech commands have been used in vehicles. However, when driving (especially a bike), surrounding noises reduce a reliability of an automatic speech recognition. Using the speech recognition alone is also difficult; the reliability of the recognition is much higher when an activation button is used to explicitly start the recognition. This limits the usefulness of the speech recognition, since instead of pressing a "start recognition" key, the user can as easily press an "answer incoming call" key.

Some cars also have dedicated keys installed for simple phone commands (e.g., Send/End keys). This solution is pretty good in terms of usability and safety, but requires complex installation.

Acceleration sensors can be used to detect simple tap or tilt gestures. For example, the user can simply tap the phone front to answer a call. However, the acceleration-sensing is sensitive to external disturbances, especially when driving on a bumpy road, or when using a non-spring-supported vehicle (e.g. most bikes do not have springs).

SUMMARY OF THE INVENTION

The object of the present invention is to provide a methodology for using a specialized cradle having mechanical switches for facilitating interactions between a communication device (such as a mobile device or a mobile phone) and a user of said devices, wherein said communication device is mounted on said cradle.

According to a first aspect of the invention, a method for transferring at least one predetermined command by a user to a communication device using a cradle, comprising the steps of: pushing said communication device in a predetermined direction to impose a pushing action on, or to make a physical contact of said communication device, with at least one switch of the cradle to reverse a state of said at least one switch, wherein said communication device is mounted on said cradle and optionally there is no said physical contact before said pushing; and communicating said reversal of the state of said at least one switch to said communication device, wherein said reversal is interpreted by the communication device as said at least one predetermined command by the user.

According further to the first aspect of the invention, the step of pushing said communication device may be implemented by applying a mechanical force to said communication device by the user, and wherein said pushing action or said physical contact is characterized in that said mechanical force creates a push force of said communication device on the at least one switch. Further, said at least one switch may be a vertical switch located on a bottom of the cradle in such a way that said vertical switch reverses its state when the push force is in a vertical direction, wherein said communication device may be optionally supported by said vertical switch when the push force is not applied. Still further, there may be the at least one switch in addition to the vertical switch contained in the cradle and said vertical switch may be used as a pivotal point for guiding the communication device towards said at least one switch. Yet still further, said pivotal point may be used as the vertical switch with the higher push force required for its reversal than for any other of the at least one switch, or said pivotal point may be only used for said guiding and not as a reversal switch.

Further according to the first aspect of the invention, in addition to said vertical switch, said at least one switch may be located on the bottom of the cradle in a plane parallel to a front plane of said communication device and containing said vertical switch and wherein said at least one switch reverses its state when the push force is created by a front tilting motion of said communication device in the plane parallel to the front plane of said communication device optionally using said vertical switch as a pivotal point for facilitating said front tilting motion. Further, in addition to said vertical switch, said at least one switch may be located on the bottom of the cradle in a plane parallel to a side plane of said communication device and containing said vertical switch and wherein said at least one switch reverses its state when the push force is created by a side tilting motion of said communication device in the plane parallel to the side plane of said communication device optionally using said vertical switch as a pivotal point for facilitating the side tilting motion. Still further, in addition to said vertical switch, said at least one switch may be located on a side of the cradle, said side being perpendicular to said bottom, in a plane parallel to a front plane of said communication device and containing said vertical switch and wherein said at least one switch reverses its state when the push force is created by a front tilting motion of said communication device in the plane parallel to the front plane of said communication device optionally using said vertical switch as a pivotal point for facilitating said front tilting motion. Yet still further, in addition to said vertical switch, said at least one switch may be located on a side of the cradle, said side being perpendicular to said bottom, in a plane parallel to a side plane of said communication device and containing said vertical switch and wherein said at least one switch reverses its state when the push force is created by a side tilting motion of said communication device in the plane parallel to the side plane of said communication device optionally using said vertical switch as a pivotal point for facilitating the side tilting motion.

Still further according to the first aspect of the invention, the step of communicating said reversal may comprise the steps of: sending at least one reversal signal by the at least one switch to a communication block; and sending at least one command signal by the communication block to the communication device, wherein said at least one command signal completes said transferring of said at least one predetermined command signal. Still further, the command signal may be sent via a wire connection or via a wireless connection by the communication block to the communication device.

According further to the first aspect of the invention, the communication device may be a mobile device or a mobile phone.

According still further to the first aspect of the invention, the step of pushing said communication device in a predetermined direction is performed by the user.

According further still to the first aspect of the invention, the cradle may be attached to a car dashboard or to a handle bar of a bicycle.

According to a second aspect of the invention, a cradle for transferring at least one predetermined command to a communication device by a user, comprising: at least one switch, responsive to a pushing action of, or to making a physical contact with, said communication device facilitated by pushing said communication device in a predetermined direction by a user, for providing a reversal signal indicative of changing a state of said at least one switch in response to said push or the physical contact, wherein said communication device is mounted on said cradle and optionally there is no said physical contact before said pushing is applied; and a communication block, responsive to said reversal signal, for providing a command signal to said communication device, wherein said at least one command signal completes said transferring of said at least one predetermined command signal to the communication device by the user.

According further to the second aspect of the invention, the command signal may be sent via a wire connection or via a wireless connection by the communication block to the communication device.

Further according to the second aspect of the invention, the pushing of said communication device may be implemented by applying a mechanical force to said communication device by the user, and wherein said pushing action or a physical contact is characterized in that said mechanical force creates a push force of said communication device on the at least one switch. Further, said at least one switch may be a vertical switch located on a bottom of the cradle in such a way that said at least one switch reverses its state when the push force is in a vertical direction, wherein said communication device is optionally supported by said vertical switch when the push force is not applied. Still further, there may be the at least one switch in addition to the vertical switch contained in the cradle and said vertical switch is used as a pivotal point for guiding the communication device towards said at least one switch. Still further, said pivotal point may be used as the vertical switch with the higher push force required for its reversal than for any other of the at least one switch, or said pivotal point may be only used for said guiding and not as a reversal switch.

Yet still further according to the second aspect of the invention, in addition to said vertical switch, said at least one switch may be located on the bottom of the cradle in a plane parallel to a front plane of said communication device and containing said vertical switch and wherein said at least one switch reverses its state when the push force is created by a front tilting motion of said communication device in the plane parallel to the front plane of said communication device optionally using said vertical switch as a pivotal point for facilitating said front tilting motion. Further, in addition to said vertical switch, said at least one switch may be located on the bottom of the cradle in a plane parallel to a side plane of said communication device and containing said vertical switch and wherein said at least one switch reverses its state when the push force is created by a side tilting motion of said communication device in the plane parallel to the side plane of said communication device optionally using said vertical switch as a pivotal point for facilitating the side tilting motion. Still further, in addition to said vertical switch, said at least one switch may be located on a side of the cradle, said side being perpendicular to said bottom, in a plane parallel to a front plane of said communication device and containing said vertical switch and wherein said at least one switch reverses its state when the push force is created by a front tilting motion of said communication device in the plane parallel to the front plane of said communication device optionally using said vertical switch as a pivotal point for facilitating said front tilting motion. Yet still further, in addition to said vertical switch, said at least one switch may be located on a side of the cradle, said side being perpendicular to said bottom, in a plane parallel to a side plane of said communication device and containing said vertical switch and wherein said at least one switch reverses its state when the push force is created by a side tilting motion of said communication device in the plane parallel to the side plane of said communication device optionally using said vertical switch as a pivotal point for facilitating the side tilting motion.

Still further according to the second aspect of the invention, said communication device mounted on said cradle may be a mobile device or a mobile phone.

According further to the second aspect of the invention, the cradle may be attached to a car dashboard or to a handle bar of a bicycle.

The present invention describes an alternative to an acceleration-sensing method that is more robust and more suitable for all driving conditions with a bike or a car. Since the tilting of the phone is sensed by mechanical switches, the solution is much less prone to external accelerations. The mechanical switches also give a tactile feedback to the user, which is helpful since other feedback types may be absent (especially a visual feedback is limited by a visual attention to a surrounding traffic).

BRIEF DESCRIPTION OF THE DRAWINGS

For a better understanding of the nature and objects of the present invention, reference is made to the following detailed description taken in conjunction with the following drawings, in which:

FIGS. 1a and 1b show front and side views, respectively, representing an example of mounting a communication device in a cradle with a vertical switch and using a vertical motion of the communication device to activate the switch, according to the present invention.

FIGS. 2a and 2b show front and side views, respectively, representing an example of mounting a communication device in a cradle with a vertical switch and additional switches located on a bottom of the cradle and using a vertical motion and/or tilting motion of the communication device to activate one of the switches, according to the present invention.

BEST MODE FOR CARRYING OUT THE INVENTION

Figures 3A, 3B:
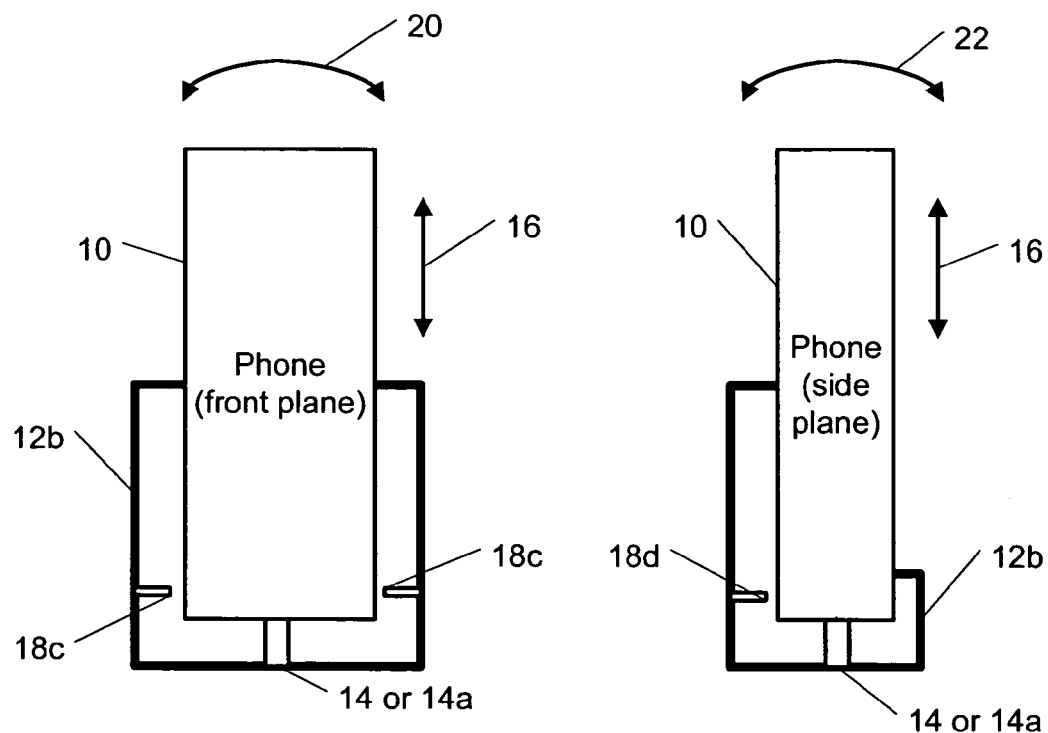
FIGS. 3a and 3b show front and side views, respectively, representing an example of mounting a communication device in a cradle with a vertical switch and additional switches located on a side of the cradle (said side is perpendicular to a bottom of the cradle) and using a vertical motion and/or tilting motion of the communication device to activate one of the switches, according to the present invention.

The present invention provides a novel methodology for using a special cradle having mechanical switches to facilitate interactions between a communication device, such as a mobile device or a mobile phone, and a user of said devices, wherein said communication device is mounted on said cradle.

The cradle can be attached for example to a car dashboard (like in current car kits) and/or to a handle bar of a bicycle. When the user pushes the communication device such as the mobile phone in different directions, the phone moves and tilts within said stabile cradle. The movements are registered through the mechanical switches within the cradle. The states of the switches are communicated to the phone through a mechanical connector (e.g., pop port) or a wireless communication channel (such as bluetooth) as a corresponding command, and the user interface reacts accordingly. At least 5 tilt/push operations are feasible, as described in different examples of FIGS. 1a and 1b, 2a and 2b, 3a and 3b. For the purpose of the present invention, the term "pushing" is used to accommodate all kinds of movement of said communication device including pulling, actuating, tilting, etc.

FIGS. 1a and 1b show front and side views, respectively, representing an example among others of mounting a communication device (e.g., a mobile phone) 10 in a cradle 12 with a vertical switch 14 located on a bottom of the cradle 12, and using a vertical motion 16 of the communication device 10, imposed on said communication device 10 by a user 11, to activate the switch 14 by a physical contact with said device 10 (optionally) or by pushing said switch 14 by said device 10 enough to reverse a state of said switch 14, according to the present invention. The cradle 12 can contain mechanical structures (not shown in detail in FIGS. 1a and 1b) for guiding the device (phone) 10 movements towards the switch 14. The physical contact of the device 10 with the switch 14 is optional before said pushing is applied. The reversal of the state of the switch 14 is communicated to said communication device 10 wherein said reversal is interpreted by the communication device 10 as a predetermined command given by the user 11, as described below in detail in regard to FIG. 4.

FIGS. 1 and 1b demonstrate the most simple implementation of the present invention with just one switch 14. More complex scenarios with multiple switches are shown in FIGS. 2a and 2b, 3a and 3b.

FIGS. 2a and 2b show front and side views, respectively, representing one example among others of mounting the communication device 10 in a cradle 12a with the vertical switch 14 and additional switches 18a and 18b, respectively, located on a bottom of the cradle 12a and using the vertical motion 16 or tilting motions 20 or 22 of the communication device 10, imposed on said communication device 10 by the user 11, to activate at least one of the switches 14, 18a or 18b by a physical contact with said device 10 (optionally) or by pushing said switch 14, 18a or 18b (using the device 10) deep enough to reverse a state of said switch 14, 18a or 18b, according to the present invention. The cradle 12 can contain mechanical structures (not shown in detail in FIGS. 2a and 2b) for guiding the device (phone) 10 movements towards the switch 14, 18a or 18b. As in FIG. 1, the physical contact of the device 10 with any of the switches 14, 18a or 18b before said pushing is applied by the user 11 is optional.

FIG. 2a, in addition to said vertical switch 14, shows two switches 18a located on the bottom of the cradle 12a (on both sides of the switch 14) in a plane parallel to a front plane of said communication device 10 and containing said vertical switch 14 and wherein said switches 18a reverse their state when pushed by said communication device 10, optionally using said vertical switch 14 as a pivotal point 14a for facilitating said front tilting motion 20 of the device 10. FIG. 2b, in addition to said vertical switch 14, shows two switches 18b located on the bottom of the cradle 12a (on both sides of the switch 14) in a plane parallel to a side plane (or perpendicular to the front plane) of said communication device 10 and containing said vertical switch 14 and wherein said switches 18b reverse their state when pushed by said communication device 10, optionally using said vertical switch 14 as a pivotal point 14a for facilitating said side tilting motion 22 of the device 10.

As in FIG. 1, the reversal of the state of the switches 14, 18a or 18b is communicated to said communication device 10 wherein said reversal is interpreted by the communication device 10 as the predetermined command given by the user 11, as described below in detail in regard to FIG. 4.

FIGS. 3a and 3b show front and side views, respectively, representing an example among others of mounting the communication device 10 in a cradle 12b with the vertical switch 14 and additional switches 18c and 18d, respectively, located on a side of the cradle 12a and using the vertical motion 16 or tilting motions 20 or 22 of the communication device 10, imposed on said communication device 10 by the user 11, to activate at least one of the switches 14, 18c or 18b by a physical contact with said device 10 (optionally) or by pushing said switch 14, 18c or 18d (using the device 10) deep enough to reverse a state of said switch 14, 18c or 18d, according to the present invention. The cradle 12 can contain mechanical structures (not shown in detail in FIGS. 3a and 3b) for guiding the device (phone) 10 movements towards the switch 14, 18c or 18d. As in FIG. 1, the physical contact of the device 10 with any of the switches 14, 18c or 18d before said pushing is applied by the user 11 is optional.

FIG. 3a, in addition to said vertical switch 14, shows two switches 18c located on a side of the cradle 12b (said side is perpendicular to the bottom of the cradle 12b) in a plane parallel to the front plane of said communication device 10 and containing said vertical switch 14 and wherein said switches 18c reverse their state when pushed by said communication device 10, optionally using said vertical switch 14 as a pivotal point 14a for facilitating said front tilting motion 20. FIG. 3b, in addition to said vertical switch 14, shows one switch 18d (it can be more than one, according to the present invention) located on one side of the cradle 12b in a plane parallel to the side plane (or perpendicular to the front plane) of said communication device 10 and containing said vertical switch 14 and wherein said switch 18d reverses its state when pushed by said communication device 10, optionally using said vertical switch 14 as a pivotal point 14a for facilitating said side tilting motion 22.

As in FIG. 1, the reversal of the state of the switches 14, 18c or 18d is communicated to said communication device 10 wherein said reversal is interpreted by the communication device 10 as the predetermined command given by the user 11, as described below in detail in regard to FIG. 4.

Figure 4:
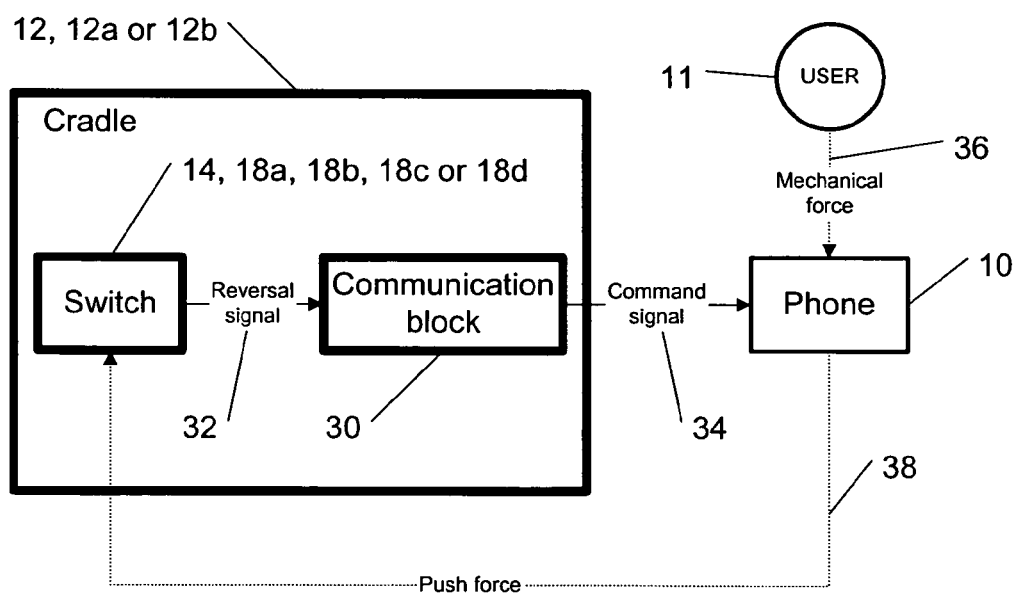
FIG. 4 is a block diagram of transferring signals and mechanical forces between a cradle, a user and a communication device.

Finally, FIG. 4 shows one example among others of a block diagram for transferring signals and mechanical forces between the cradle 12, 12a or 12b, the user 11 and the communication device (e.g. the mobile device or the mobile phone) 10. This block diagram applies to all scenarios shown in FIGS. 1*a* and 1*b*, 2*a* and 2*b*, 3*a* and 3*b*.

A mechanical force 36 is applied to the communication device (the mobile device or the mobile phone) 10 by the user 11 as an indication of a predetermined command to be transferred to said communication device 10. This command, for example, can be to "pick up" the phone and start conversation in response to a phone ring. The mechanical force 36 creates a push force 38 imposing a pushing action of said communication device 10 on one of the switches 14, 18*a*, 18*b*, 18*c* or 18*d* (or making a physical contact between the communication device 10 and one of said switches) to reverse the state of one of the switches 14, 18*a*, 18*b*, 18*c* or 18*d*. Said reversal of the one of the switches 14, 18*a*, 18*b*, 18*c* or 18*d* is communicated to said communication device 10 by sending a reversal signal 32 by one of the switches 14, 18*a*, 18*b*, 18*e* or 18*d* to a communication block 30 of the cradle 12, 12*a* or 12*b*. The communication block 30 sends a command signal 34 to the communication device 10 and completes said transferring of said predetermined command from the user 11 to the communication device 10. The command signal 34 can be sent via a wire connection using a mechanical connector (e.g. pop port) or via a wireless connection using a wireless communication channel (such as bluetooth) by the communication block 30 to the communication device 10.

There are many possible variations of the present invention. For example different types of switches can be used. One possibility is to use a switch responsive to a physical contact or a touch. Another variation relates to the pivotal point 14*a* which can be used as the vertical switch 14, for example, with higher pushing force required for its reversal than for other switches 18*a* 18*b*, 18*c* or 18*d*, or said pivotal point 14*a* can be only used for said guiding the device 10 and not as a reversal switch.

What is claimed is:

1. A method for transferring at least one predetermined command by a user to a communication device using a cradle, comprising the steps of:
    pushing said communication device in a predetermined direction to impose a pushing action on, or to make a physical contact of said communication device, with at least one switch of the cradle to reverse a state of said at least one switch, wherein said communication device is mounted on said cradle and optionally there is no said physical contact before said pushing; and
    communicating said reversal of the state of said at least one switch to said communication device, wherein said reversal is interpreted by the communication device as said at least one predetermined command by the user.

2. The method of claim 1, wherein the step of pushing said communication device is implemented by applying a mechanical force to said communication device by the user, and wherein said pushing action or said physical contact is characterized in that said mechanical force creates a push force of said communication device on the at least one switch.

3. The method of claim 2, wherein said at least one switch is a vertical switch located on a bottom of the cradle in such a way that said vertical switch reverses its state when the push force is in a vertical direction, wherein said communication device is optionally supported by said vertical switch when the push force is not applied.

4. The method of claim 3, wherein there is the at least one switch in addition to the vertical switch contained in the cradle and said vertical switch is used as a pivotal point for guiding the communication device towards said at least one switch.

5. The method of claim 4, wherein said pivotal point is used as the vertical switch with the higher push force required for its reversal than for any other of the at least one switch, or said pivotal point is only used for said guiding and not as a reversal switch.

6. The method of claim 3, wherein, in addition to said vertical switch, said at least one switch is located on the bottom of the cradle in a plane parallel to a front plane of said communication device and containing said vertical switch and wherein said at least one switch reverses its state when the push force is created by a front tilting motion of said communication device in the plane parallel to the front plane of said communication device optionally using said vertical switch as a pivotal point for facilitating said front tilting motion.

7. The method of claim 3, wherein, in addition to said vertical switch, said at least one switch is located on the bottom of the cradle in a plane parallel to a side plane of said communication device and containing said vertical switch and wherein said at least one switch reverses its state when the push force is created by a side tilting motion of said communication device in the plane parallel to the side plane of said communication device optionally using said vertical switch as a pivotal point for facilitating the side tilting motion.

8. The method of claim 3, wherein, in addition to said vertical switch, said at least one switch is located on a side of the cradle, said side being perpendicular to said bottom, in a plane parallel to a front plane of said communication device and containing said vertical switch and wherein said at least one switch reverses its state when the push force is created by a front tilting motion of said communication device in the plane parallel to the front plane of said communication device optionally using said vertical switch as a pivotal point for facilitating said front tilting motion.

9. The method of claim 3, wherein, in addition to said vertical switch, said at least one switch is located on a side of the cradle, said side being perpendicular to said bottom, in a plane parallel to a side plane of said communication device and containing said vertical switch and wherein said at least one switch reverses its state when the push force is created by a side tilting motion of said communication device in the plane parallel to the side plane of said communication device optionally using said vertical switch as a pivotal point for facilitating the side tilting motion.

10. The method of claim 1, wherein the step of communicating said reversal comprises the steps of:
    sending at least one reversal signal by the at least one switch to a communication block; and
    sending at least one command signal by the communication block to the communication device, wherein said at least one command signal completes said transferring of said at least one predetermined command signal.

11. The method of claim 9, wherein the at least one command signal is sent via a wire connection or via a wireless connection by the communication block to the communication device.

12. The method of claim 1, wherein said communication device is a mobile device or a mobile phone.

13. The method of claim 1, wherein the step of pushing said communication device in a predetermined direction is performed by the user.

14. The method of claim 1, wherein said cradle is attached to a car dashboard or to a handle bar of a bicycle.

15. A cradle for transferring at least one predetermined command to a communication device by a user, comprising:
  at least one switch, responsive to a pushing action of, or to making a physical contact with, said communication device facilitated by pushing said communication device in a predetermined direction by a user, for providing a reversal signal indicative of changing a state of said at least one switch in response to said push or the physical contact, wherein said communication device is mounted on said cradle and optionally there is no said physical contact before said pushing is applied; and
  a communication block, responsive to said reversal signal, for providing a command signal to said communication device, wherein said at least one command signal completes said transferring of said at least one predetermined command signal to the communication device by the user.

16. The cradle of claim 15, wherein the command signal is sent via a wire connection or via a wireless connection by the communication block to the communication device.

17. The cradle of claim 15, wherein said pushing of said communication device is implemented by applying a mechanical force to said communication device by the user, and wherein said pushing action or a physical contact is characterized in that said mechanical force creates a push force of said communication device on the at least one switch.

18. The cradle of claim 17, wherein said at least one switch is a vertical switch located on a bottom of the cradle in such a way that said at least one switch reverses its state when the push force is in a vertical direction, wherein said communication device is optionally supported by said vertical switch when the push force is not applied.

19. The cradle of claim 18, wherein there is the at least one switch in addition to the vertical switch contained in the cradle and said vertical switch is used as a pivotal point for guiding the communication device towards said at least one switch.

20. The cradle of claim 19, wherein said pivotal point is used as the vertical switch with the higher push force required for its reversal than for any other of the at least one switch, or said pivotal point is only used for said guiding and not as a reversal switch.

21. The cradle of claim 18, wherein, in addition to said vertical switch, said at least one switch is located on the bottom of the cradle in a plane parallel to a front plane of said communication device and containing said vertical switch and wherein said at least one switch reverses its state when the push force is created by a front tilting motion of said communication device in the plane parallel to the front plane of said communication device optionally using said vertical switch as a pivotal point for facilitating said front tilting motion.

22. The cradle of claim 18, wherein, in addition to said vertical switch, said at least one switch is located on the bottom of the cradle in a plane parallel to a side plane of said communication device and containing said vertical switch and wherein said at least one switch reverses its state when the push force is created by a side tilting motion of said communication device in the plane parallel to the side plane of said communication device optionally using said vertical switch as a pivotal point for facilitating the side tilting motion.

23. The cradle of claim 18, wherein, in addition to said vertical switch, said at least one switch is located on a side of the cradle, said side being perpendicular to said bottom, in a plane parallel to a front plane of said communication device and containing said vertical switch and wherein said at least one switch reverses its state when the push force is created by a front tilting motion of said communication device in the plane parallel to the front plane of said communication device optionally using said vertical switch as a pivotal point for facilitating said front tilting motion.

24. The cradle of claim 18, wherein, in addition to said vertical switch, said at least one switch is located on a side of the cradle, said side being perpendicular to said bottom, in a plane parallel to a side plane of said communication device and containing said vertical switch and wherein said at least one switch reverses its state when the push force is created by a side tilting motion of said communication device in the plane parallel to the side plane of said communication device optionally using said vertical switch as a pivotal point for facilitating the side tilting motion.

25. The cradle of claim 15, wherein said communication device mounted on said cradle is a mobile device or a mobile phone.

26. The cradle of claim 15, wherein said cradle is attached to a car dashboard or to a handle bar of a bicycle.

* * * * *